United States Patent [19]

Kelley

[11] Patent Number: 4,508,213
[45] Date of Patent: Apr. 2, 1985

[54] HYDRAULIC TAKE-UP DEVICE

[76] Inventor: Hugh D. Kelley, 56 Mayfair Dr., Bella Vista, Ark. 72712

[21] Appl. No.: 519,034

[22] Filed: Aug. 1, 1983

[51] Int. Cl.³ .............................................. B65G 23/44
[52] U.S. Cl. ..................................... 198/813; 474/109
[58] Field of Search ......................... 198/813; 474/109

[56] References Cited

U.S. PATENT DOCUMENTS

| | | | |
|---|---|---|---|
| 2,788,883 | 4/1957 | Schwenk | 198/813 |
| 3,015,473 | 1/1962 | Frellsen | 198/813 |
| 4,128,164 | 12/1978 | Sandberg | 198/813 |
| 4,284,192 | 8/1984 | Taylor | 474/109 |
| 4,440,097 | 4/1984 | Teske | 198/813 |

Primary Examiner—Joseph E. Valenza
Assistant Examiner—Douglas C. Voorhees
Attorney, Agent, or Firm—Edwin H. Crabtree

[57] ABSTRACT

A hydraulic take-up device for removing slack and applying constant and adjustable tension on an endless conveyor belt or chain. The device characterized by having a hydraulic cylinder which applies continuous pressure on take-up bearings surrounding a take-up shaft mounted at one end of a conveyor.

6 Claims, 4 Drawing Figures

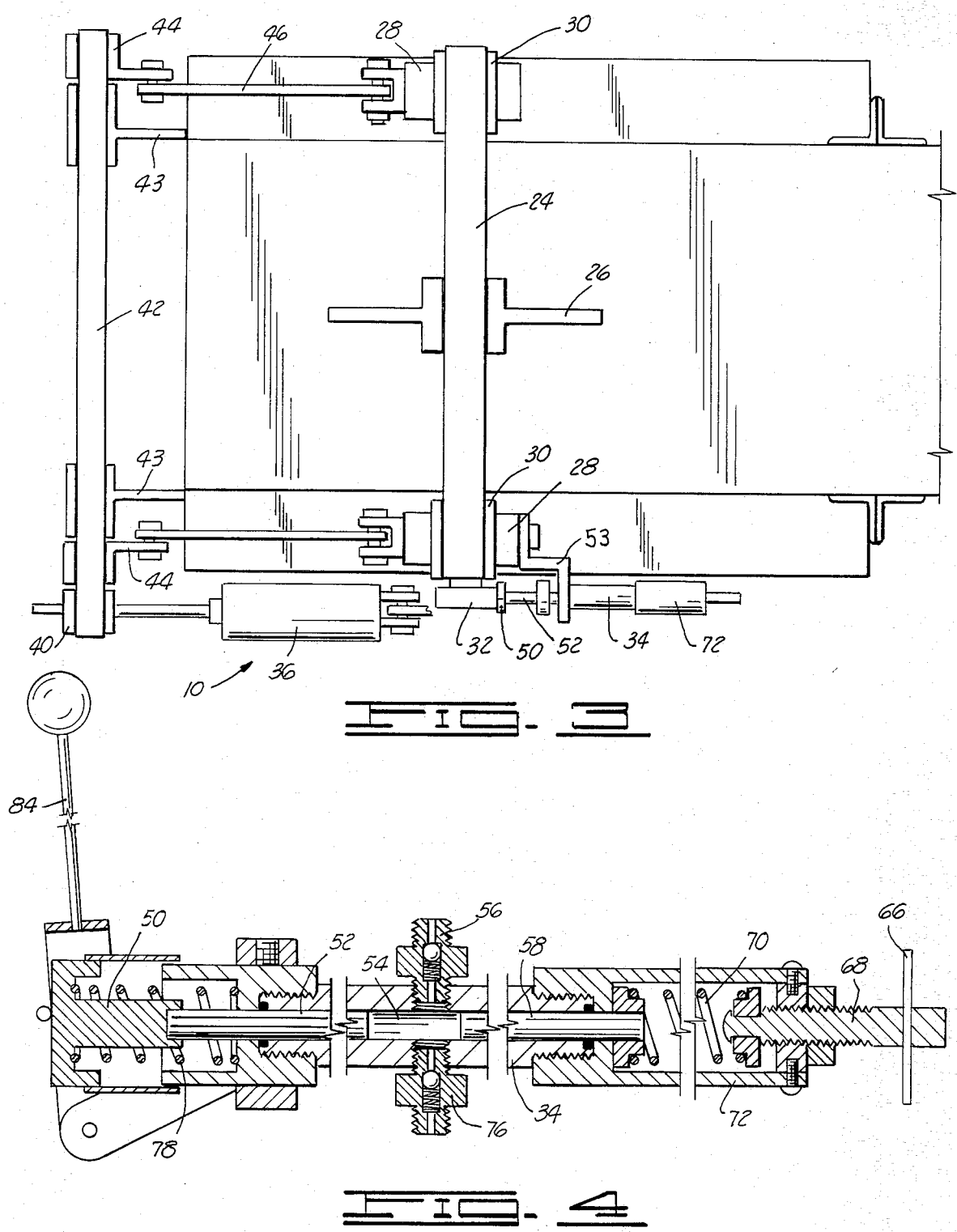

HYDRAULIC TAKE-UP DEVICE

BACKGROUND OF THE INVENTION

This invention relates to a device for taking up slack and applying constant tension on a conveyor belt or chain and more particularly but not by way of limitation to a device hydraulically operated which applies continuous and adjustable pressure on take-up bearings surrounding a take-up shaft mounted at one end of the conveyor.

Heretofore, there have been conveyor take-up devices having adjusting screws for the proper positioning of the bearings mounted on a take-up shaft. Also, there are take-up devices which use counter weights for providing a constant automatic adjustment. The adjusting screws quite often present the problem of over-stressing the conveyor belt or chain where the adjusting screws have been turned too far with a hand tool. Further a maintenance mechanic has the problem of not knowing when he has adjusted the screw to the proper tension on the belt or chain. Another problem is that after the chain or belt has stretched or worn slightly, the chain or belt becomes slack. This can cause the belt to slip at the driven sprocket causing damage to the belt or sprocket and even cause a fire or explosion. The slack in the chain can also cause the chain to ride around the drive sprocket too far and damage the chain, sprocket and other parts of the conveyor.

The counter weight used for applying tension on a conveyor is bulky in size and in many applications there is not enough space to accomodate the take-up weights. Also, this type application has the disadvantage in that it is difficult to adjust the tension on the belt or chain because it is difficult to remove or add bulky weights. Another disadvantage is sudden starts cause the weights to suddenly rise and fall throwing a shock load on the belt or chain.

There are various types of take-up systems for conveyors disclosed, for example, in U.S. Pat. No. 2,788,883 to Schwenk, U.S. Pat. No. 2,815,853 to Likens, U.S. Pat. No. 2,986,267 to Carlson et al, U.S. Pat. No. 3,638,781 to Comley, U.S. Pat. No. 3,765,525 to Hartwig and U.S. Pat. No. 3,777,879 to Dehne. None of these prior art patents specifically disclose the unique features of the subject hydraulic take-up device. The subject hydraulic take-up device eliminates the above mentioned problems inherent in the prior art take-up device.

SUMMARY OF THE INVENTION

The subject invention provides a take-up device for a conveyor belt which removes slack and applies constant tension on an endless conveyor belt or chain.

The hydraulic take-up device includes a hydraulic cylinder which provides a controlled and constant pressure on take-up bearings mounted on a take-up shaft at one end of an endless conveyor belt or chain.

The hydraulic take-up device includes a hydraulic pump which is continuously operated by the rotation of the take-up shaft and without generating heat in the hydraulic system.

The invention eliminates the need of adjusting screws for proper positioning of the take-up bearings and eliminates the use of heavy, bulky counter weights which require extra space in an installation.

Each conveyor has different design tension for the belt or chain drive. The different required tension is due to various lengths, widths and the weight of the belt or chain. Therefore, the subject device is adjustable for applying the required tension on the belt or chain.

The hydraulic take-up device includes an eccentric mounted on one end of the take-up shaft. A hydraulic pump having a piston is mounted adjacent the eccentric with the piston biased against the eccentric and driven thereby as the take-up shaft rotates. The hydraulic pump operates a hydraulic cylinder through a hydraulic fluid supply line. Linkage means is connected to the hydraulic cylinder and the bearing housings with the linkage means applying constant tension on the bearing housings surrounding the take-up bearings.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 is a top view of the hydraulic take-up device.

FIG. 4 is a side sectional view of the hydraulic pump.

DETAILED DESCRIPTION OF THE DRAWINGS

Figure 1:
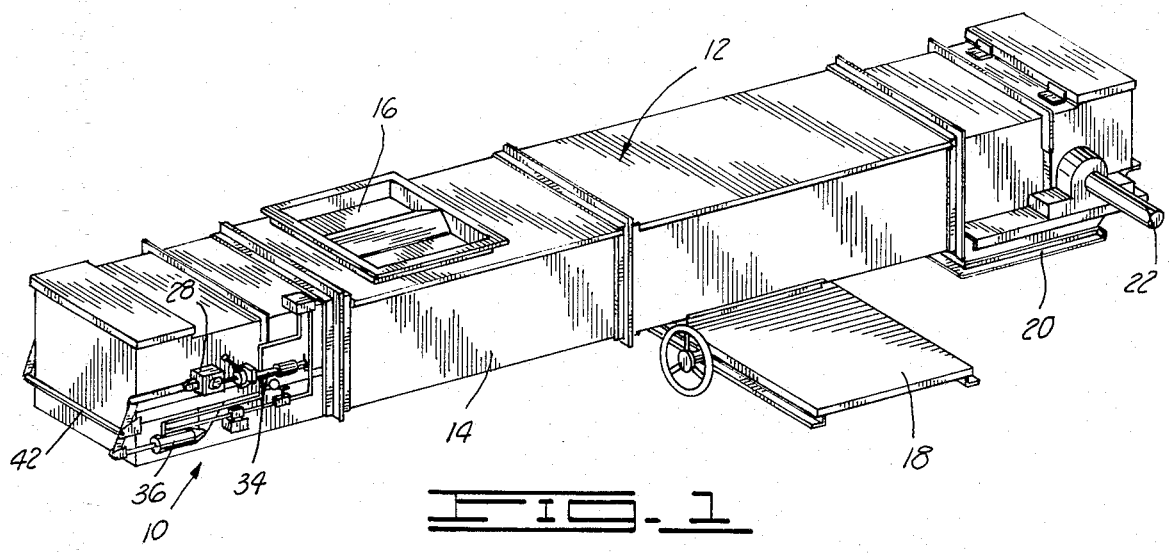
FIG. 1 is a perspective view of a drag conveyor with the hydraulic take-up device mounted at one end of a conveyor housing.

In FIG. 1 the hydraulic take-up device is designated by general reference numeral 10. The take-up device 10 is mounted on one end of a drag conveyor 12 having a conveyor housing 14. The housing 14 includes an intake opening 16 and intermediate discharge 18 and a head discharge 20. The conveyor 12 may include a belt conveyor or a chain conveyor mounted therein and driven by the drive shaft 22 with a take-up shaft 24 shown in FIG. 3 at the opposite end of the housing 14. The take-up shaft 24 includes a conveyor sprocket 26. Surrounding the ends of the take-up shaft 24 are take-up bearing housings 28 having take-up bearings 30. The belt or chain conveyor is not shown in the drawings.

Figure 2:
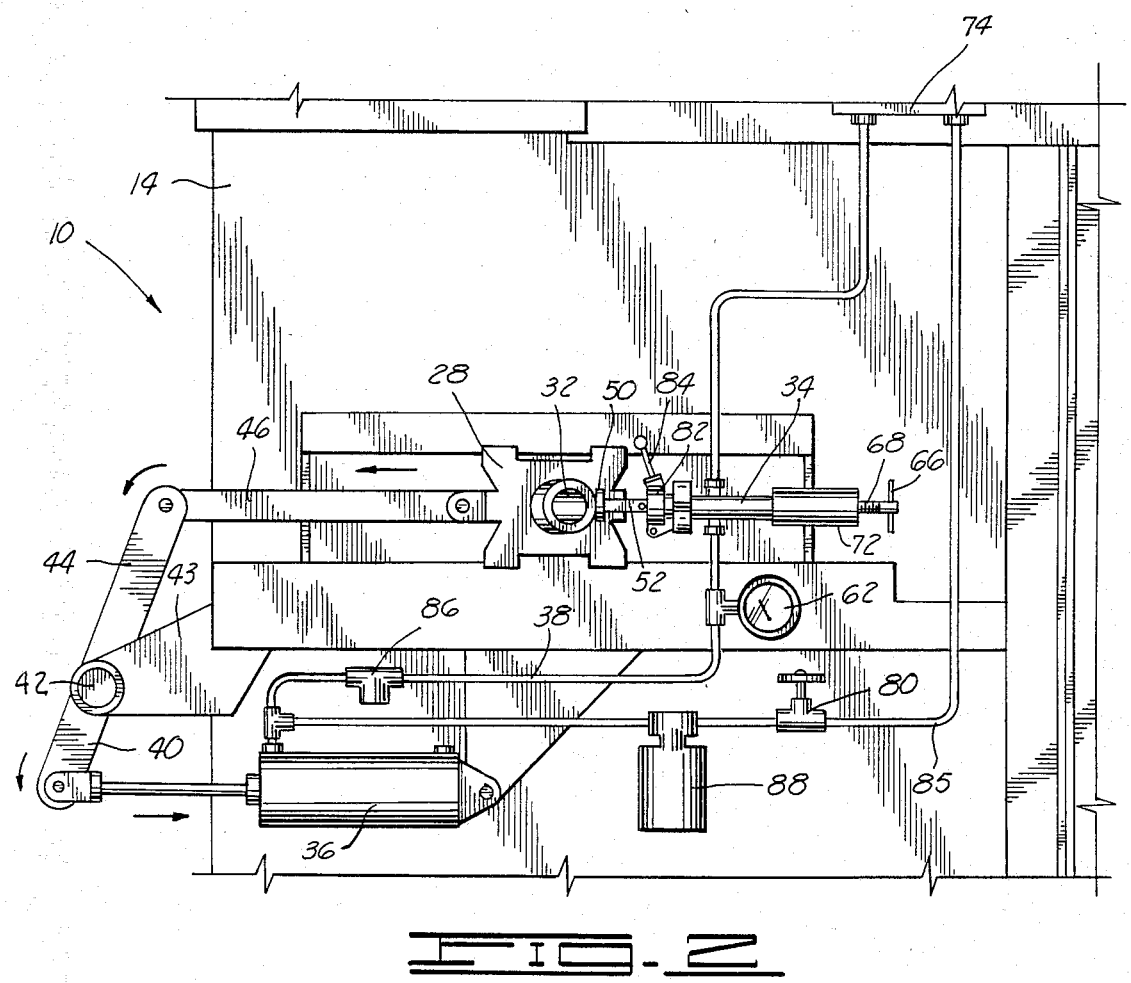
FIG. 2 is a side view of the hydraulic take-up device.

Referring now to both FIGS. 2 and 3, the hydraulic take-up device 10 includes an eccentric bearing 32 mounted on one end of the take-up shaft 24. A hydraulic pump 34 is driven by the eccentric 30 as the shaft 24 rotates. The pump 34 drives a hydraulic cylinder 36 through hydraulic fluid supply line 38. The hydraulic cylinder 36 is connected to a cylinder crank 40 which rotates a crank shaft 42 mounted on shaft supports 43. The crank shaft 42, in turn, rotates a pair of bearing cranks 44 mounted on the oposite ends of the crank shaft 42. The bearing cranks 44 are connected to take-up links 46. The links 46 are connected to and provide constant tension on the take-up bearing housings 28 and take-up bearings 30. This holds the take-up shaft 24 under pressure thereby removing slack as the belt or chain is stretched or becomes worn.

Referring now to both FIGS. 2 and 4, in operation, the eccentric 32 when rotated by the take-up shaft 24 engages a piston cap 50 mounted on one end of a piston 52 received in the hydraulic pump 34. The eccentric 32 forces the piston 52 to the right thereby displacing oil through a check valve 76 and into an oil chamber in the cylinder 36. A bracket 53 shown in FIG. 3 is attached to the housing 28 and moves with the shaft 24 keeping the eccentric 32 and piston cap 50 in proper alignment.

It should be noted, during the operation of the conveyor and knowing the desired operating tension to be applied to the belt or chain, it is possible to obtain a very high mechanical advantage through the use of the subject take-up device 10.

For example, the conveyor system with a design belt tension of 900 lbs. using a three inch diameter cylinder and a hydraulic pump with the piston 52 having a ⅜ inch diameter would have a mechanical pressure of 14 pounds delivered from the eccentric 32 to the piston 52. From this, it can be calculated that in order to obtain 900 lbs. of tension on the take-up shaft 24, the oil pressure would need to be 128 psi. By observing an oil pressure gauge 62 mounted in the fluid supply line 38 while the conveyor is running and shaft 24 is rotating and manually moving a handle 66 and an adjusting screw 68 inwardly in the pump 34 and adjusting the compression on a spring 70 mounted in a spring housing 72. This is done until the gauge 62 reads 128 lbs., then at that time a constant tension of 900 pounds is thereby placed on the belt or chain.

If the spring 70 has been properly adjusted to the desired setting and the pistons 52 and 58 have operated enough times to build up the desired pressure in the hydraulic system, then as the piston 52 moves to the right, the oil in the chamber 54 will force the piston 58 to move to the right compressing the spring 70. When a small amount of slack occurs on the chain or belt, then the take-up bearings 30 are automatically positioned by pumping more oil into the pressure side of the system from an oil reservoir 74. The eccentric 32 rotates against the piston cap 50 pushing the piston 52 to the right. Since spring 70 has more compression than the oil pressure, piston 58 does not move. Piston 52 forces the oil from the chamber 54 through a check valve 76 and into the pressure side of the system and thus to the hydraulic cylinder 36. A spring 78 is compressed and it is strong enough to move the piston 52 to the left so that piston cap 50 maintains continuous contact with the eccentric 30. As the piston 52 moves to the left, oil is sucked from the oil reservoir 74 through the check valve 56, refilling the chamber 54 with oil.

Further, it should be noted during a normal cycle when a small amount of slack occurs in the belt or chain, the above mentioned operation would operate, except only a small amount of oil will be displaced through the check valve 76 and the remainder of the oil would be expelled into the chamber 54 occupied by piston 58.

When the take-up device 10 has repositioned the take-up bearings 30 to their extreme limit of travel, it is necessary, quite often, to shorten the chain or belt. After shortening the belt or chain, it is necessary to reposition the cylinder 36 so the take-up bearings 30 are in a position to give maximum take-up. Cylinder 36 can be easily repositioned after a shut-off valve 80 is manually opened, allowing the pressure side of the cylinder 36 to be opened to the reservoir 74. The shut-off valve 80 must be closed before pressure can be built up into the system by manually operating the pump 34 with a pump handle 84 which manually forces the piston 52 to the right. The original pressure must be built up by manually pumping the pump 34 because shaft 24 will not rotate with a slack belt conveyor and should not be started with a slack chain driven conveyor. The valve 80 is connected between the supply line 38 and a hydraulic fluid return line 85.

In FIG. 2 an optical feature of the take-up device 10 includes a pressure safety switch 86. If an unusual load was applied on the belt or chain by accident, such as a flooding of material onto the belt or chain or a foreign object striking the belt, the pressure in the system would increase rapidly energizing the normally closed pressure switch 86. The switch 86 would stop the conveyor drive motor which is not shown in the drawings.

The take-up device 10 includes an optional hydraulic accumulator 88. When starting the conveyor a severe shock is created due to the great mass of chains and flights mounted thereon. In the past, springs were used to absorb the shock. The springs would often over deflect during the start up causing excessive slack in the chain. The accumulator 88 smoothly absorbs this type of shock with a predetermined amount of slack in the chain.

Changes may be made in the construction and arrangement of the parts or elements of the embodiments as described herein without departing from the spirit or scope of the invention defined in the following claims.

What is claimed is:

1. A hydraulic take-up device for applying constant and adjustable pressure on a pair of bearing housings having a take-up bearing mounted on the ends of a take-up shaft, the shaft receiving one end of an endless conveyor belt or chain thereon, the device comprising:
   an eccentric mounted on one end of the take-up shaft:
   a hydraulic pump having a piston, the piston biased against the eccentric and driven thereby as the take-up shaft rotates;
   a hydraulic cylinder operated by the hydraulic pump through a hydraulic fluid supply line; and
   linkage means connected to the hydraulic cylinder and the bearing housings for applying tension on the bearing housing.

2. The device as described in claim 1 wherein the linkage means includes a cylinder crank attached to the hydraulic cylinder and to a crank shaft, the crank shaft having a pair of bearing cranks attached at opposite ends and a pair of take-up links connected to the bearing cranks and the bearing housings.

3. The device as described in claim 1 further including an accumulator connected to the hydraulic cylinder through the hydraulic fluid supply line.

4. The device as described in claim 1 further including a pressure switch and pressure gauge mounted in the hydraulic fluid supply line between the hydraulic pump and the hydraulic cylinder.

5. A hydraulic take-up device for applying constant and adjustable pressure on a pair of bearing housings having a take-up bearing mounted on the ends of the take-up shaft, the shaft receiving one end of an endless conveyor belt or chain thereon, the device comprising:
   an eccentric bearing mounted on one end of the take-up shaft;
   a hydraulic pump having a piston, the piston biased against the eccentric bearing and driven thereby as the take-up shaft rotates;
   a hydraulic cylinder operated by the hydraulic pump through a hydraulic fluid supply line;
   a cylinder crank attached to the hydraulic cylinder;
   a crank shaft attached to the cylinder crank;
   a pair of bearing cranks attached to opposite ends of the crank shaft; and
   a pair of take-up links connected to the bearing cranks and the bearing housings.

6. The device as described in claim 5 further including a hydraulic reservoir attached to a hydraulic fluid supply line and a return line, the hydraulic fluid supply line having a pressure gauge and a pressure switch attached thereto.

* * * * *